United States Patent
Wang et al.

(10) Patent No.: US 9,776,163 B1
(45) Date of Patent: Oct. 3, 2017

(54) METHOD AND SYSTEM FOR THE INTEGRAL CHLORINE DIOXIDE PRODUCTION WITH RELATIVELY INDEPENDENT SODIUM CHLORATE ELECTROLYTIC PRODUCTION AND CHLORINE DIOXIDE PRODUCTION

(71) Applicant: GuangXi University, Nanning (CN)

(72) Inventors: Shuangfei Wang, Nanning (CN); Chengrong Qin, Nanning (CN); Xueping Song, Nanning (CN); Xusheng Li, Nanning (CN); Shuangxi Nie, Nanning (CN); Chen Liang, Nanning (CN)

(73) Assignee: GuangXi University, Nanning (CN)

( * ) Notice: Subject to any disclaimer, the term of this patent is extended or adjusted under 35 U.S.C. 154(b) by 0 days.

(21) Appl. No.: 15/589,094

(22) Filed: May 8, 2017

(30) Foreign Application Priority Data

Jun. 7, 2016 (CN) .......................... 2016 1 0396232

(51) Int. Cl.
*B01J 19/00* (2006.01)
*B01J 19/06* (2006.01)
(Continued)

(52) U.S. Cl.
CPC ......... *B01J 19/245* (2013.01); *B01J 19/0013* (2013.01); *B01J 19/06* (2013.01); *B01J 19/087* (2013.01); *B01J 19/2465* (2013.01); *C01B 11/025* (2013.01); *C25B 1/265* (2013.01); *C25B 15/08* (2013.01); *B01J 2219/00051* (2013.01);
(Continued)

(58) Field of Classification Search
CPC .... B01J 19/00; B01J 19/0006; B01J 19/0013; B01J 19/06; B01J 19/08; B01J 19/087; B01J 19/24; B01J 19/245; B01J 19/2455; B01J 19/2465; B01J 2219/00049; B01J 2219/00051; B01J 2219/08; B01J 2219/0803; B01J 2219/0873; B01J 2219/0877; B01J 2219/24; C01B 11/00; C01B 11/02; C01B 11/022; C01B 11/023; C01B 11/025; C25B 1/00; C25B 1/24; C25B 1/26; C25B 1/265; C25B 15/00; C25B 15/08

See application file for complete search history.

(56) References Cited

U.S. PATENT DOCUMENTS

| 5,324,497 A * | 6/1994 | Westerlund | C25B 1/26 204/277 |
|---|---|---|---|
| 5,419,818 A * | 5/1995 | Wanngard | C25B 1/265 205/503 |
| 2011/0027166 A1* | 2/2011 | Stuart | B01D 59/32 423/580.2 |

* cited by examiner

*Primary Examiner* — Natasha Young
(74) *Attorney, Agent, or Firm* — LeonardPatel PC

(57) ABSTRACT

A system for the integral chlorine dioxide production with relatively independent sodium chlorate electrolytic production and chlorine dioxide production is provided. The system may feed electrolyte solution into a solid-liquid filter, filtering out the crystal and eliminating sodium chloride and sodium dichromate. The sodium chlorate crystal may be fed into a chlorine dioxide generator after dissolving, while sodium chloride and sodium dichromate solution separately return to electrolyzer for electrolysis process. Sodium chloride may be constantly formed as a by-product in the chlorine dioxide production unit, and solution containing the sodium chloride is withdrawn from the generator and, after filtration, washing and dissolution, recycled back to sodium chlorate production unit. This way, there is no need of sodium chloride make-up.

8 Claims, 1 Drawing Sheet

(51) Int. Cl.
  *B01J 19/08* (2006.01)
  *B01J 19/24* (2006.01)
  *C01B 11/00* (2006.01)
  *C01B 11/02* (2006.01)
  *C25B 1/00* (2006.01)
  *C25B 1/24* (2006.01)
  *C25B 1/26* (2006.01)
  *C25B 15/00* (2006.01)
  *C25B 15/08* (2006.01)

(52) U.S. Cl.
  CPC    *B01J 2219/0803* (2013.01); *B01J 2219/0877* (2013.01); *B01J 2219/24* (2013.01)

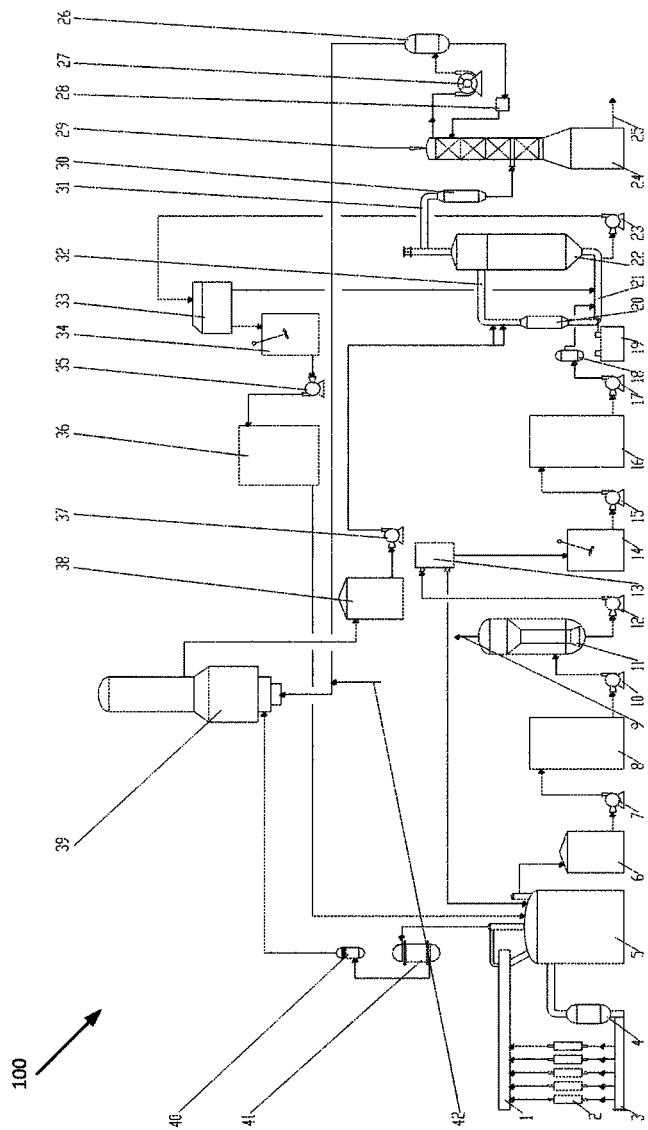

METHOD AND SYSTEM FOR THE INTEGRAL CHLORINE DIOXIDE PRODUCTION WITH RELATIVELY INDEPENDENT SODIUM CHLORATE ELECTROLYTIC PRODUCTION AND CHLORINE DIOXIDE PRODUCTION

CROSS-REFERENCE TO RELATED APPLICATION

This application claims the benefit of Chinese Patent Application No. CN 201610396232.2, filed on Jun. 7, 2016. The subject matter thereof is hereby incorporated herein by reference in its entirety.

FIELD

The present invention relates to a method and system for integral chlorine dioxide production with relatively independent sodium chlorate electrolytic production and chlorine dioxide production.

BACKGROUND

Chlorine dioxide (ClO2), which is also a fine bleaching agent for bleaching process in paper industry, is a strong oxidizing agent classified as efficient and distinguished disinfectant by the World Health Organization (WHO). During the process of integrated chlorine dioxide production, sodium chlorate reacts with hydrochloric acid, which plays a role as a reducing agent and an acidic medium. The process equation is represented as follows $$NaClO_3 + 2HCl \rightarrow ClO_2 + \tfrac{1}{2}Cl_2 + H_2O + NaCl$$

Sodium chlorate is one of the main feedstock for producing sodium chlorate, that is generated from sodium chloride electrolysis process. Sodium chloride and water in an electrolysis unit will eventually form sodium chlorate and hydrogen after a chain reaction, which is represented as $$NaCl + 3H_2O \rightarrow NaClO_3 + 3H_2$$

As another main feed stock of the process is hydrochloric acid. Hydrochloric acid is produced by combining chlorine gas and hydrogen gas to produce hydrogen chloride gas, which is absorbed in pure water, resulting in 31 percent of hydrochloric acid, and is shown as follows:

$$Cl_2 + H_2 \rightarrow 2HCl$$

In a typical method, a sodium chlorate electrolysis system and a chlorine dioxide production system are jointly associated together in the process of integral chlorine dioxide production process. In this process, electrolyte containing strong sodium chlorate enters chlorine dioxide generator, while the byproduct—sodium chloride solution (namely, weak sodium chlorate solution) generated in the chlorine dioxide—returns back to the electrolytic system. As the gas stream decomposes within the chlorine dioxide generator, a large amount of pure water enters the generator, resulting in lowering concentration of sodium chlorate solution, which returns back to electrolysis system, and affecting consistency of electrolysis system and hydrochloric acid burner. Moreover, a small amount of sodium dichromate is required in the electrolyzer to reduce oxygen content for the process. After sodium chlorate, which contains a slight amount of sodium dichromate, from the electrolysis process is introduced into the generator, the sodium dichromate runs off as evaporation of solution along with gases, and mixes into chlorine dioxide solution, contaminating the environment. Simply put, the electrolyzer system shall have sodium dichromate refilled constantly.

SUMMARY

Certain embodiments of the present invention may provide solutions to the problems and needs in the art that have not yet been fully identified, appreciated, or solved by current sodium chlorate electrolysis and chlorine dioxide production systems. In some embodiments, a system for integral chlorine dioxide production with relatively independent sodium chlorate electrolytic production and chlorine dioxide production is provided.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a diagram illustrating a system for integral chlorine dioxide production, according to an embodiment of the present invention.

DETAILED DESCRIPTION OF THE EMBODIMENTS

In some embodiments, a method and system for the integral chlorine dioxide production with relatively independent sodium chlorate electrolytic production and chlorine dioxide production is described to maintain operational consistency of the electrolysis system and hydrochloric acid burner as decomposition occurs in the chlorine dioxide generator. In other words, sodium chloride and sodium dichromate can achieve recycling, while requiring no further refill for the system.

FIG. 1 is a diagram illustrating a system 100 for integral chlorine dioxide production, according to an embodiment of the present invention. In some embodiments, system 100 may include an electrolytic production unit of sodium chlorate (NaClO$_3$) and crystallization unit, a chlorine dioxide (ClO$_2$) production unit, and a hydrochloric acid (HCl) synthesis unit. NaClO3 electrolytic production unit and crystallization unit may include an electrolyzer 2, degasifier 1, liquor feed header 3, electrolyte cooler 4, and a chlorine dioxide reactor 5 connected in series to form an electrolysis loop. The NaClO3 electrolytic production unit and crystallization unit may also include an electrolyte storage tank 6, an electrolyte transit pump 7, an electrolyte buffer tank 8, an electrolyte transfer pump 10, an evaporator crystallizer 11, a sodium chlorate slurry pump 12, and a solid-liquid filter 13 that are linked with pipelines to form NaClO3 crystallization unit. NaClO3 electrolytic production unit and crystallization unit may further include a sodium chlorate dissolve tank 14, a sodium chlorate transit pump 15, a sodium chlorate buffer tank 16, a sodium chlorate feed pump 17, and a sodium chlorate filter 18 that are linked with pipelines to form a sodium chlorate feeding system. In some embodiments, one end of solid-liquid filter 13 connects with chlorine dioxide reactor 5 through pipelines, while the other end connects with sodium chlorate dissolve tank.

The $ClO_2$ production unit may include a generator heater 20, a lower circulation pipe 21, a chlorine dioxide generator 22, and an upper circulation pipe 32 that are part of circulation loop for system generation and pumping liquid with circulation pump 19. The $ClO_2$ production unit may also include a generator exhaust pipe 31, indirect cooler 30, chlorine dioxide absorber 24, absorber tail gas fan 27, liquid-gas separator 26, and a dilute chlorine dioxide solution cooler 28 that are connected in sequence via pipelines to compose chlorine dioxide solution production unit. The $ClO_2$ production unit may also include a sodium chloride extraction pipe 23, a sodium chloride filter 33, a sodium chloride dissolve tank 34, a sodium chloride transit pump 35, and a sodium chloride buffer tank 36, all of which are linked in sequence to form a sodium chloride recycle system. In certain embodiments, sodium chloride buffer tank 36 connects with chlorine dioxide reactor (5) through pipelines.

HCl synthesis unit may include a hydrogen cooler 41, a hydrogen demister 40, a hydrochloric acid synthesis burner 39, a hydrochloric acid storage tank 38, and a hydrochloric feed pump 37, all of which are connected in sequence to form the unit. The hydrochloric acid feed pump 37 may connect with generator heater 20 via pipelines, and hydrogen cooler 41 may connect with chlorine dioxide reactor 5 via hydrogen exhaust pipes, in some embodiments. Also, vacuity in chlorine dioxide generator 22 is generated by an absorber tail gas fan 27 in some embodiments.

In some embodiment, a system for integral chlorine dioxide production is provided. As shown in FIG. 1, sodium chlorate electrolyzer 2 may be fed with refined brine solution, and then, the electrolyte that is generated may enter a degasifier 1 through pipelines to separate gases that comes along. Gases may be introduced into hydrogen cooler 41, passing hydrogen demister 40 and arriving at hydrochloric acid synthesis burner 39, while liquor may enter sodium chlorate chlorine dioxide reactor 5 to generate concentrated sodium chlorate electrolyte.

Most of, or all of, the electrolytes enter evaporator crystallizer 11 to form sodium chlorate crystals in the solution. The solution is introduced into solid-liquid filter 13 to remove sodium chloride and sodium dichromate. Sodium chlorate crystals may enter generator lower circulation pipe 21 after dissolved and filtered, while sodium chloride and sodium dichromate are separated out by separator 13 and returned back to the electrolysis system for further processing with electrolyzer 2.

Hydrogen gas from electrolysis unit may enter cooler 41 and demister 40 to remove vapors, and then enter hydrochloric acid synthesis burner 39, forming hydrogen chloride gas in burner 39 with chlorine gas, and then hydrochloric acid for chlorine dioxide production unit prior to the cooling and absorbing process.

Strong sodium chlorate solution from the electrolysis unit may react with hydrochloric acid within chlorine dioxide generator 22. Flash evaporation may occur to form a production stream of chlorine dioxide, chlorine gas, sodium chloride, and vapor. Mixed gases are withdrawn from top of generator, flowing through exhaust pipes, which are then cooled by indirect cooler 30 prior to entering absorber 24. This is where mixed gases are absorbed and chlorine dioxide solution are formed.

In certain embodiments, solution generated in process (1) may include sodium chlorate solution at a concentration of 550-650 g/L and sodium chloride solution at a concentration of 90-110 g/L. Reaction temperature range within the generator may range between 68 degrees Celsius (C) to 72 degrees C., vacuity thereof is −77~−78 KPa. Furthermore, concentration of sodium chlorate added into the generator is between 640 and 660 g/L, and weight concentration of hydrochloric acid added into said generator is between 29 and 32%.

In some embodiments, the crystallization process of sodium chlorate described as process (2) may include introducing an electrolyte into electrolyte buffer tank 8 through electrolyte transit pump 7. The electrolyte from buffer tank 8 may then enter evaporator crystallizer 11 by way of transfer pump 10 to form crystals.

Also, in some embodiments, sodium chlorate crystals generated in process (1) may be fed into dissolve tank 14 to be processed prior to pumping to buffer tank 16 through transit pump 15. Sodium chlorate may be withdrawn from buffer tank 16 via feed pump 17, passing through sodium chlorate filter 18 and arriving at generator lower circulation pipe 21 afterwards.

The byproduct—chlorine gas formed during the reaction—may be fed into a hydrochloric acid burner 39 to react with hydrogen gas from electrolyzer and may outsource hydrogen gas to form hydrochloric acid. Reaction liquor, which may include sodium chloride crystal, is introduced into sodium chloride filter to filter out crystals. The way, the crystals may be dissolved in dissolve tank 34 for recycling back to electrolysis system, while filtered liquor is recycled back to chlorine dioxide generator 22.

Tail gas from absorber may enter gas-liquid separator 26 to separate liquid, which returns back to absorber 24 after cooler 28. Concurrently, chlorine gas, which may be separated, is introduced into burner 39 and mixed with outsourced chlorine gas to react with hydrogen gas from electrolysis system to form hydrochloric acid in burner 39.

In the entire process, sodium chlorate production unit and chlorine dioxide production unit are relatively independent. There is no liquid transfer from chlorine dioxide production unit to sodium chlorate production unit. Even if chlorine dioxide decomposes, diluted water entering the generator will not impact the sodium chlorate electrolytic system, and production may remain normal due to the relatively constant concentration of sodium chlorate and sodium chloride in the electrolytic system. The hydrochloric acid burner may also function well due to constant hydrogen supply from the electrolytic system.

The sodium chloride and sodium dichromate may only remain circulating in the sodium chlorate system, staying away from the chlorine dioxide production unit. Sodium chloride solution that is generated in chlorine dioxide unit may return back to sodium chlorate unit, avoiding chemical refilling for the system.

The sodium chlorate unit and chlorine dioxide generation unit is relatively independent. For example, no object directly enters the chlorine dioxide unit from sodium chlorate unit. This may prevent the impurities from the sodium chlorate system from entering the chlorine dioxide generation unit, thereby reducing the decomposition of chlorine dioxide gas in the chlorine dioxide generator.

Further, in some embodiments, solution concentration is controllable during the sodium chlorate crystal dissolution process. It will effectively increase the reaction efficiency of chlorine dioxide generation. Traditional chlorine dioxide generation systems do not allow high concentration sodium chlorate entering the generator to prevent crystal from being generated, and therefore, chlorine dioxide generation efficiency is not satisfied.

In certain embodiments, sodium chloride extraction pump may pump the liquid with sodium chloride crystal and hydrochloric acid from the lower circulation pipe. The liquid may then be sent to the sodium chloride filter for filtration and washing. After filtration, the liquid with hydrogen chloride may flow back to chlorine dioxide generator reducing acid lost. The traditional chlorine dioxide system pumps the weak sodium chlorate solution and sends to high temperature gas separator. The weak sodium chlorate reacts with hydrochloric acid and generates sodium chloride and Cl2, the consuming the hydrochloric acid. In some embodiments, producing 1 ton of chlorine dioxide may consume 1.3 tons of hydrochloric acid, while traditional chlorine dioxide system consumes 1.6 tons of hydrochloric acid to produce 1 ton of chlorine dioxide.

Since liquid does not return to the sodium chlorate electrolytic system from the chlorine dioxide production unit, pH of electrolytic system liquor can remain relatively constant. Further, by controlling cell liquor pH within favorable range, electrolytic efficiency is improved.

The following examples are provided for purposes of illustrating the technical ideas and characteristics of some embodiments of the present invention, and therefore, should not limit the scope of the present invention.

Example 1

In an embodiment, an integral chlorine dioxide production with relatively independent sodium chlorate electrolytic production and chlorine dioxide production is provided. This may be produced by the sodium chlorate electrolysis and crystalize unit, chlorine dioxide generation unit, and hydrochloric acid synthesis unit.

The operation process is shown as follows.

In some embodiments, refined brine is electrolyzed in the electrolyzer 2, and electrolyte may enter degasifier 1 by pipe with the gas. After gas-liquid is separated, the gas enters hydrogen cooler 41, after hydrogen demister (40). The gas may then enter hydrochloric acid synthesis burner 39, and the liquid may enter sodium chlorate reactor. After reaction, high concentration sodium chlorate electrolyte is produced, including 550 g/L sodium chlorate solution and 110 g/L sodium chloride solution.

The electrolyte may overflow to electrolyte storage tank 6, and may be transferred by electrolyte transit pump 7. The electrolyte may flow to electrolyte buffer tank 8, and electrolyte transfer pump 10 may pump the electrolyte into evaporator crystallizer 11. Sodium chlorate discharge pump 12 may pump the liquid with crystal to the solid-liquid filter 13 for separation and wash out the sodium chloride and sodium dichromate in the sodium chlorate crystal. The obtained sodium chloride crystal may then be sent to sodium chloride dissolve tank 14 for dissolving, and sodium chloride transit pump 15 may send the solution to sodium chloride buffer tank 16. The sodium chloride feed pump 17 may pump solution within the sodium chloride buffer tank 16, and pump the sodium chloride to sodium chloride filter 18. The solution may then enter generator lower circulation pipe 21, causing the solution with sodium chloride and sodium dichromate, which is separated by solid-liquid filter 13, may flow back to electrolytic system.

The hydrogen from electrolyte system may enter hydrogen cooler 41 for cooling, and hydrogen demister 40 may eliminate moisture. The hydrogen may then enter hydrochloric acid synthesis burner 39, the strong chlorine, weak chlorine and hydrogen chloride may then burn and hydrogen chloride gas may be generated in the hydrochloric acid synthesis burner (39). After cooling, adsorption to generate hydrogen chloride liquid may facilitate the hydrogen chloride liquid to be sent to chlorine dioxide generation unit.

The strong sodium chlorate from the electrolyte system may enter the lower circulation pipe 21. The hydrogen chloride from hydrochloric acid synthesis system may the generator 22 from the jet nozzle above the generator heater 20, and after reaction and flash, chlorine dioxide, chlorine, sodium chloride and H2O steam may be generated. In an embodiment, the temperature in generator 22 is approximately 68 degrees C. and the vacuum degree is approximately −77 KPa. The sodium chlorate concentration feed to chlorine dioxide generator 22 is 640 g/L in some embodiments. The feeding hydrogen chloride liquid weight concentration is approximately 29%, and the reaction liquid in the generator 22 is at a boiling status, for example. Gas mixture with chlorine dioxide, chlorine and steam exhaust from top of generator 22, through the generator exhaust pipe 31 and indirectly to cooler 30 for cooling, may then enter absorber 24. Chilled water may enter absorber 24 from top pipe 29, and absorb the mixed gases to generate chlorine dioxide solution. The generated chlorine dioxide solution may be sent out for use by pipe at the bottom 25.

The tail gas from absorber 24 may enter gas-liquid separator 26. In some embodiments, liquid enters chlorine dioxide solution cooler 28, and then flows back to absorber 24. Weak chlorine may be sent to hydrochloric acid synthesis burner 39 to generate hydrogen chloride with hydrogen from electrolyte system and strong chlorine from the outside supply.

By way of reaction in the generator, the sodium chloride crystal may be produced and the sodium chloride extraction pump 23 in generator lower circulation pipe may suck (or draw) out liquid with sodium chloride crystal and send the liquid to sodium chloride filter 33 for filtration and wash. Obtained sodium chloride crystal may be sent to sodium chloride dissolve tank 34 to dissolve, and sodium chloride transit pump 35 may pump the liquid in the sodium chloride dissolve tank 34 to sodium chloride buffer tank 36, and recycle to electrolytic system. The remaining liquid after filtration may include hydrochloric acid that is sent back to generator 24.

Example 2

In this example, chlorine dioxide production with relatively independent sodium chlorate electrolytic production and chlorine dioxide production may be produced by sodium chlorate electrolysis and crystalize unit, chlorine dioxide generation unit and hydrochloric acid synthesis unit.

In an embodiment, refined brine is electrolyzed in the electrolyzer 2. Electrolyte may enter degasifier 1 by pipe with the gas, and after separation of gas-liquid, gas may enter hydrogen cooler 41. Also, after hydrogen demister 40, the gas may then enter hydrochloric acid synthesis burner (39), and the liquid may enter sodium chlorate reactor. After reaction high concentration, sodium chlorate electrolyte is produced, include 600 g/L sodium chlorate solution and 100 g/L sodium chloride solution.

Electrolyte may overflow to electrolyte storage tank 6 and may be transferred by electrolyte transit pump 7. Further, the electrolyte may flow to electrolyte buffer tank 8, and electrolyte transfer pump 10 may pump the electrolyte into evaporator crystallizer 11. Sodium chlorate outlet pump 12 may pump the liquid with crystal to the solid-liquid filter 13 for separation of the liquid and crystal, and wash out the sodium chloride and sodium dichromate in the sodium chlorate crystal. Sodium chloride crystal that is obtained from the filtration may be sent to sodium chloride dissolving tank 14 for dissolving, and sodium chloride transit pump 15 may send a solution to sodium chloride buffer tank 16. Sodium chloride feed pump 17 may pump the sodium chloride buffer tank 16 and also pump the sodium chloride to sodium chloride filter 18. The sodium chloride may then enter generator lower circulation pipe 21, and the solution with sodium chloride and sodium dichromate are separated from solid-liquid filter 13 flowing back to electrolytic system.

The hydrogen from the electrolyte system may enter hydrogen cooler 41 for cooling, and hydrogen demister 40 may eliminate moisture. They hydrogen may then enter hydrochloric acid synthesis burner 39. The strong chlorine, weak chlorine and hydrogen chloride may burn and generate hydrogen chloride gas in the hydrochloric acid synthesis burner 39. After cooling hydrogen chloride liquid may be generated and sent to chlorine dioxide generation unit.

The strong sodium chlorate from the electrolyte system may enter lower circulation pipe 21, and the hydrogen chloride from hydrochloric acid synthesis system may enter generator 22 from the jet nozzle above generator heater 20. After reaction and flash, chlorine dioxide, chlorine, sodium chloride and H2O steam is generated, and the temperature in generator (22) is approximately 70 degrees C. and the temperature in vacuum is approximately −77.5 KPa. The sodium chlorate concentration feed to chlorine dioxide generator 22 is approximately 650 g/L, and the feeding hydrogen chloride liquid weight concentration is approximately 30%. Further, the reaction liquid in the generator 22 is at a boiling status.

Gas mixture with chlorine dioxide, chlorine and steam exhaust from top of generator 22, through generator exhaust pipe 31 and indirect cooler 30 cooling, may then enter absorber 24. Chilled water may also enter the absorber 24 from top pipe 29. This way, the mixed gas may be absorbed and chlorine dioxide solution may be generated. In some embodiments, the generated chlorine dioxide solution may be used by pipe in bottom 25. The tail gas from absorber 24 may enter gas-liquid separator 26. Liquid may enter chlorine dioxide solution cooler 28 then flow back to absorber 24. The weak chlorine may be sent to hydrochloric acid synthesis burner (39) to generate hydrogen chloride with hydrogen from electrolyte system and strong chlorine from the outside supply.

In the reaction of generator, the sodium chloride crystals are produced and the sodium chloride extraction pump 23 in generator lower circulation pipe to suck (or draw) out liquid with sodium chloride crystal and send it to sodium chloride filter 33 for filtration and wash. Obtained sodium chloride crystal may be sent to sodium chloride dissolve tank 34 to dissolve, and sodium chloride transfer pump 35 may pump the liquid in the sodium chloride dissolve tank 34 to sodium chloride buffer tank 36 and recycle to electrolytic system. The remaining liquid after filtration, which includes hydrogen chloride, may be sent back to generator 24.

Example 3

In some embodiments, chlorine dioxide production with relatively independent sodium chlorate electrolytic production and chlorine dioxide production may be produced by a sodium chlorate electrolysis and crystalize unit, chlorine dioxide generation unit and hydrochloric acid synthesis unit.

In an embodiment, refined brine may be electrolyzed in electrolyzer 2, and electrolyte may enter degasifier 1 by a pipe with the gas. After the gas-liquid is separated, the gas may enter a hydrogen cooler 41, and after entering hydrogen demister 40, the gas may then enter hydrochloric acid synthesis burner 39. The liquid may enter sodium chlorate reactor, and after reaction, high concentration sodium chlorate electrolyte may be produced. The high concentration sodium chlorate electrolyte may include 650 g/L sodium chlorate solution and 90 g/L sodium chloride solution in certain embodiments.

In some embodiments, the electrolyte may overflow to electrolyte storage tank 6, and transferred by electrolyte transit pump 7, the electrolyte may flow to electrolyte buffer tank 8. Electrolyte transit pump 10 may pump the electrolyte into evaporator crystallizer 11, and sodium chlorate outlet pump 12 may pump the liquid with crystal to the solid-liquid filter 13 for separation and wash out the sodium chloride and sodium dichromate in the sodium chlorate crystal. The obtained sodium chloride crystal may be sent to sodium chloride dissolve tank 14 for dissolving, and sodium chloride transfer pump 15 may send the solution to sodium chloride buffer tank 16. Sodium chloride feed pump 17 may suck (or draw) out the sodium chloride from buffer tank 16 and pump the sodium chloride to sodium chloride filter 18. The sodium chloride may then enter generator lower circulation pipe 21, and the solution with sodium chloride and sodium dichromate, which is separated from solid-liquid filter 13, may flow back to the electrolytic system.

The hydrogen from electrolyte system may enter hydrogen cooler 41 for cooling, and hydrogen demister 40 may eliminate moisture. The hydrogen may then enter hydrochloric acid synthesis burner 39, and the strong chlorine, weak chlorine and hydrogen chloride may burn and generate hydrogen chloride gas in the hydrogen chloride synthesis burner 39. After cooling, adsorption to generate hydrogen chloride liquid, the hydrogen chloride liquid may be sent to chlorine dioxide generation unit.

The strong sodium chlorate from the electrolyte system may enter the lower circulation pipe 21, and the hydrogen chloride from hydrochloric acid synthesis system may enter generator 22 from the jet nozzle above the generator heater 20. After reaction and flash generated chlorine dioxide, chlorine, sodium chloride and H2O steam, the temperature in generator 22 is 72 degrees C. and the vacuum degree is approximately—78 KPa. The sodium chlorate concentration fed to chlorine dioxide generator 22 is 660 g/L, and the feeding hydrogen chloride liquid weight concentration is 32% in some embodiments. The reaction liquid in the generator 22 is at a boiling status in certain embodiments. Gas mixture with chlorine dioxide, chlorine and steam exhaust from top of generator 22, and through the generator exhaust pipe 31 and indirect cooler 30 for cooling, then may enter absorber 24, followed by chilled water entering absorber 24 from top pipe 29. The mixed gas may be absorbed to generate chlorine dioxide solution. The generated chlorine dioxide solution may be sent out for using by pipe in bottom 25. The tail gas from absorber 24 enter gas-liquid separator 26. The liquid may enter chlorine dioxide solution cooler 28 and then flow back to absorber 24. Weak chlorine may be sent to hydrochloric acid synthesis burner 39 to generate hydrogen chloride with hydrogen from electrolyte system and strong chlorine from outside supply. In the reaction to generator, the sodium chloride crystal may be produced and the sodium chloride extraction pump 23 in the generator lower circulation pipe may suck out liquid with sodium chloride crystal and send the liquid to sodium chloride filter 33 for filtration and wash. The obtained sodium chloride crystal may be sent to sodium chloride dissolving tank 34 to dissolve, and sodium chloride transit pump 35 may pump the liquid in the sodium chloride dissolving tank 34 to sodium chloride buffer tank 36 and recycle back to electrolytic system. The remainder of the liquid after filtration contained hydrogen chloride will be sent back to generator 24.

Comparative Example 1

In the traditional integral chlorine dioxide production process, if the capacity is 20 t per day, the hydrochloric acid consumption is 32 t.

In some embodiments, the integral chlorine dioxide generation system having a relatively independent sodium chlorate electrolysis unit and chlorine dioxide unit, if the capacity is 20 t per day, the hydrochloric acid consumption is 26 t.

Comparative Example 2

In the traditional integral chlorine dioxide production process, if the capacity is 30 t per day, the hydrochloric acid consumption is 48 t.

In some embodiments, the integral chlorine dioxide generation system having a relatively independent sodium chlorate electrolysis unit and chlorine dioxide unit, if the capacity is 30 t per day, the hydrochloric acid consumption is 39 t.

Comparative Example 3

In the traditional integral chlorine dioxide plant, if the capacity is 35 t per day, the hydrochloric acid consumption is 56 t.

In some embodiments, in the integral chlorine dioxide generation system having a relatively independent sodium chlorate electrolysis unit and chlorine dioxide unit, if the capacity is 35 t per day, the hydrochloric acid consumption is 45.5 t.

The comparative examples show that the integral chlorine dioxide generation system and method with relatively independent sodium chlorate electrolysis unit and chlorine dioxide unit consume less hydrochloric acid than traditional comprehensive chlorine dioxide system, when both of systems are in the same capacity.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for integral chlorine dioxide production with independent sodium chlorate electrolytic production and chlorine dioxide production, the system comprising:
    an electrolytic production unit for sodium chlorate (NaClO3) and a crystallization unit;
    a chlorine dioxide (ClO2) production unit; and
    a hydrochloric acid (HCl) synthesis unit,
    wherein
    the NaClO3 electrolytic production unit and crystallization unit comprise
        an electrolysis loop formed by connecting in series an electrolyzer, a degasifier, an electrolyte feed header, an electrolyte cooler, and a chlorine dioxide reactor,
        a NaClO3 crystallization unit formed by linking with pipelines an electrolyte storage tank, an electrolyte transit pump, an electrolyte buffer tank, an electrolyte transfer pump, an evaporator crystallizer, a sodium chlorate slurry pump, and a solid-liquid filter, and
        a sodium chlorate feeding system formed by linking with pipelines a sodium chlorate dissolve tank, a sodium chlorate transit pump, a sodium chlorate buffer tank, a sodium chlorate feed pump, and a sodium chlorate filter, wherein
        one end of the solid-liquid filter is connected with the chlorine dioxide reactor through pipelines and other end is connected with the sodium chlorate dissolve tank; and
    the ClO$_2$ production unit comprise
        a generation system formed by a circulation loop with a heat generator, a lower circulation pipe, a chlorine dioxide generator, and an upper circulation pipe, pumping liquor with a circulation pump;

a chlorine dioxide solution production unit formed by connecting in sequence via pipelines a generator exhaust pipe, an indirect cooler, a chlorine dioxide absorber, a tail gas fan, a liquid-gas separator, and a dilute chlorine dioxide solution cooler;

a sodium chloride recycle system formed by linking in sequence a sodium chloride extraction pipe, a sodium chloride filter, a sodium chloride dissolve tank, a sodium chloride transit pump, and a sodium chloride buffer tank, the sodium chloride buffer tank is connected with the chlorine dioxide reactor through pipelines; and a HCl synthesis unit comprising
a unit formed by connecting in sequence a hydrogen cooler, a hydrogen demister, a hydrochloric acid synthesis burner, a hydrochloric acid storage tank, and a hydrochloric feed pump, the hydrochloric acid feed pump is connected with the heat generator heater via pipelines, and the hydrogen cooler is connected with the chlorine dioxide reactor via one or more hydrogen exhaust pipes.

2. The system of claim 1, further comprising:
a sodium chlorate electrolyzer fed with refined brine solution, and generated electrolyte enters the degasifier through pipelines to separate gases that come along, wherein the gases are introduced into hydrogen cooler, passing hydrogen demister, and arriving at hydrochloric acid synthesis burner, while liquor enters sodium chlorate chlorine dioxide reactor to generate concentrated sodium chlorate solution;

evaporator crystallizer receives sodium chlorate solution to form sodium chlorate crystals in the solution, the solution is introduced into solid-liquid filter, removing sodium chloride and sodium dichromate, sodium chlorate crystals enter chlorine dioxide generator lower circulation pipe after dissolving, while sodium chloride and sodium dichromate are separated out by filter, returning back to the electrolysis system for further processing with the electrolyzer;

hydrogen gas from the electrolysis unit enters the cooler and demister to remove vapors, the hydrogen gas enters hydrochloric acid synthesis burner to burn with chlorine gas, forming hydrogen chloride gas in the burner, the gas being cooled and absorbed to form the hydrochloric acid solution for the chlorine dioxide production unit; and strong sodium chlorate solution from electrolysis unit reacts with hydrochloric acid within chlorine dioxide generator, wherein flash evaporation occurs to form a production stream of chlorine dioxide, chlorine gas, sodium chloride and vapor, mixed gases are withdrawn from top of generator, flowing through exhaust pipes, cooling down by indirect cooler prior to the absorber where the mixed gases are absorbed and form chlorine dioxide solution.

3. The system of claim 2, wherein the generated electrolyte generated comprises concentrated sodium chlorate solution at a concentration of 600-700 g/l and sodium chloride solution at a concentration of 100-110 g/l.

4. The system of claim 2, wherein reaction temperature range within the generator is in range of 68 and 72 degree Celsius, vacuity is between −77 and −78 kpa, concentration of sodium chlorate added into the generator is between 640 and 660 g/l, and weight concentration of hydrochloric acid added into the generator is between 29 and 32%.

5. The system of claim 2, wherein the electrolyte is introduced into the electrolyte buffer tank through an electrolyte transit pump, and
the electrolyte from the buffer tank enters the evaporator crystallizer via transfer pump to form crystals.

6. The system of claim 2, wherein the generated sodium chlorate crystals are fed into a dissolve tank to be processed prior to pumping to the buffer tank by way of the transit pump, and
the sodium chlorate is withdrawn from the buffer tank via the feed pump, passing through the sodium chlorate filter and arriving at chlorine dioxide generator lower circulation pipe afterwards.

7. The system of claim 2, wherein a byproduct of chlorine gas formed during the reaction is fed into the hydrochloric acid burner to react with hydrogen gas from the electrolyzer and outsourced chlorine gas to form hydrochloric acid,
within the chlorine dioxide generator, reaction liquor comprising sodium chloride crystal is introduced into the sodium chloride filter to filter out crystals, dissolving the crystals in the dissolve tank for recycling back to the electrolysis system, while the filtered liquor is recycled back to the chlorine dioxide generator.

8. The system of claim 2, wherein tail gas from the absorber enters the gas-liquid separator to separate chlorine dioxide, which returns back to the absorber after cooler, and separated chlorine gas is introduced into the burner and mixed with outsourced chlorine gas to react with the hydrogen gas from the electrolysis system to form hydrochloric acid in the burner.

* * * * *